April 18, 1939.    R. A. BRIGGS, JR    2,154,661
DUST COLLECTOR
Filed July 21, 1937
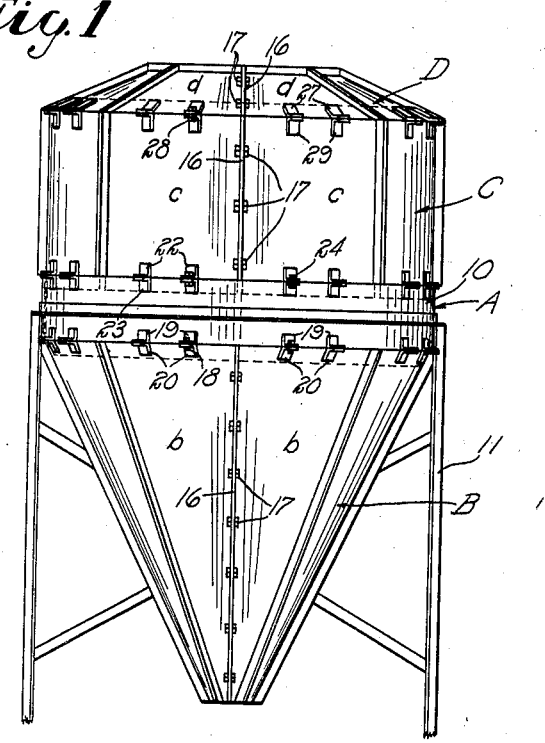
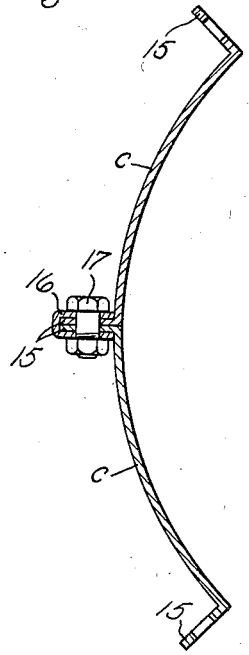
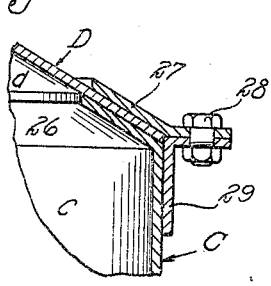
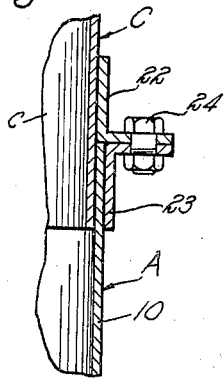
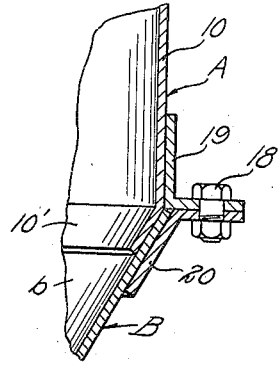
Inventor
ROBERT A. BRIGGS, JR.
By T. Clay Lindsey
Attorney Patented Apr. 18, 1939

2,154,661

UNITED STATES PATENT OFFICE 2,154,661

DUST COLLECTOR

Robert A. Briggs, Jr., West Hartford, Conn.

Application July 21, 1937, Serial No. 154,817

4 Claims. (Cl. 220—4)

This invention relates to dust collectors and similar devices having housings for rotary air circulation.

Heretofore, in the manufacture of dust collectors and similar devices, it has been common practice to construct their housings of metal sheets or plates having overlapping joints riveted and/or spot welded together to form an integral unitary housing structure. Constructions of this type have necessitated that the air stream be rotated in only one direction within their housings since air would be forced out between the joints if the air were circulated towards the open ends of these lap joints and improper circulation would be set up. Dust collectors of this type are assembled as integral units to be mounted on the tops of buildings or in other positions where they are usually exposed to the weather. This prior method of construction has made it extremely difficult and impracticable to repair any portion of the housings. In fact, it has been necessary to cut the housings apart with a torch, with the result that it has been found much cheaper and easier to replace the entire installation rather than to replace the worn parts. Collectors of this type have no re-sale value in view of the fact that they cannot be easily dis-assembled and they are usually considered a total loss whenever one of the plates rusts through.

It is, therefore, an aim of this invention to provide a dust collector or the like having a housing composed of parts removably secured together and which may be easily assembled and dismantled at point of installation without distortion or destruction of any part.

A further object of this invention resides in the provision of a dust collector having a fabricated substantially circular housing which may be easily assembled and disassembled and permits rotation of an air stream within the housing in either direction.

It is a further object of my invention to provide a dust collector having a plurality of similar and interchangeable sheet metal parts which may be easily and removably bolted in assembled arrangement.

A further object of this invention resides in the provision of an improved arrangement having the above noted and other advantages and which is characterized by its extreme simplicity in construction, economy of manufacture, ease of shipment, and facility of assembly and repair.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the drawing:

Figure 1 is a side elevation of an assembled dust collector made in accordance with my invention;

Fig. 2 is an enlarged fragmentary cross section showing the assembly of two body plates;

Fig. 3 is a fragmentary section illustrating the assembly of the top cone plates with the body plates;

Fig. 4 is a fragmentary section showing the assembly of the body section plates with the intermediate supporting section; and Fig. 5 is a fragmentary section showing the assembly of the lower cone with the intermediate support.

In accordance with the present invention, I have provided a dust collector or like device having a housing composed of preshaped interchangeable sheet metal plates which may be easily and removably secured together and to a supporting structure at point of installation and in such manner that the various members of the housing may be individually removed and replaced to facilitate repair.

As illustrated in the accompanying drawing, my dust collector comprises an upper circular part and a lower cone portion. The upper circular part includes a one-piece intermediate body or housing member A which has a diameter commensurate with that of the collector and a substantially vertical peripheral wall 10 which is approximately one-third of the over-all height of the upper circular housing and relatively short as compared to its diameter. There is supported on the intermediate body member A the upper portion of the circular housing C; the over-all height of the member A and member C being equal to that of the standard dust collector when the upper circular housing is made in a single structure. The intermediate body member A is also provided with an inwardly and downwardly tapering conical flange 10' against which the lower cone B is positioned when suspended from the intermediate body member A. The top of the collector is closed by an upper cone D which overlies an inwardly and upwardly tapering flange 26 of the member C and is secured to the member C around the outside peripheral edge thereof. The entire structure may be supported above a roof, or any other suitable position, by a supporting frame, such as the metal frame 11 which, in the present instance, is shown formed of angle irons and is secured in any suitable way to the intermediate body member A.

The housing portions B, C, and D are each composed of respectively similar preshaped sheet metal plate sectors b, c, and d. As shown in Fig. 2, which is illustrative of the manner in which adjacent sectors are secured together, the side edges of each sector respectively have longitudinally extending outturned lips 15 disposed substantially radially with respect to the axis of the housing. The adjacent lips of adjacent sectors are secured in abutting relation by locking clips 16 formed of sheet metal strips bent to substantially U-shaped cross sections and each slidably fitting over a pair of lips 15. The lips and locking members are provided with aligned similarly spaced holes receiving bolts 17 to removably and rigidly fasten the housing portions in assembled relation. With joints of this type between sector plates c, the air stream in the upper circular housing may be circulated in either direction and the joints will remain substantially airtight. If desired, gaskets of suitable material or various sealing cements may be applied between the joints during assembly.

As shown in Figs. 1 and 5, the upper end of each of sectors b forming the lower cone is rigidly and removably clamped in individual overlying relation against flange 10' of the intermediate body member 10 by bolts 18 passing through brackets 19 and 20 respectively secured as by welding to wall 10 and sectors b. Similarly, body sectors c are secured at their lower ends to the upper end of wall 10 as by brackets 22 and 23 respectively secured to the sectors c and member A and removably clamped in position by bolts 24. The lower ends of sectors c are preferably received in overlying relation against the inner face of wall 10 to provide a tight joint. The upper ends of each body sector c are further provided with an inwardly extending parti-conical lip which when joined together constitute the flange 26 supporting the sectors d of the upper cone and forming a substantially tight seal therewith. Sectors d have brackets 27 fastened as by welding at their lower ends and bolts 28 removably secure these brackets to brackets 29 secured to the upper ends of body sectors c. It will be understood, of course, that the joints between the various assembled portions of the housing may also be provided with suitable gaskets or seals as described with reference to the assembly of sectors c. The sectors b and d are each of such size as to provide bottom and top openings for the housing, and one of the body sectors c may be apertured to receive a duct. However, as these features do not constitute parts claimed in the present invention, they are not shown in detail.

In the installation of my housing structure, frame 11 is first rigidly mounted in desired position, such as upon the roof of a building. The intermediate body member A is then secured to the frame after which the various sectors may be mounted on the intermediate body member A in any convenient order. It will thus be evident that I have provided a housing structure which may be quickly and easily assembled at point of installation by the simple expedient of removably bolting pre-shaped sheet metal members together as they are built up from or suspended from the common intermediate body member. In the event that one of the plates of my structure needs replacement, it may be individually and quickly replaced without interfering with or disassembling other parts of the structure.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A dust collector comprising a housing having an annular ring member which presents a substantially free exterior surface for the purpose of providing an area for the attachment of the supporting structure of the housing, and a plurality of freely removable portions detachably secured to said ring member.

2. A dust collector comprising a housing having an annular ring member which presents a substantially free exterior surface for the purpose of providing an area for the attachment of the supporting structure of the housing, a plurality of freely removable portions detachably secured to said ring member, and means supporting said housing and secured to the annular ring member.

3. A dust collector comprising a housing having a top member, a bottom member, and an intermediate member, said intermediate member consisting of an annular ring having a substantially free exterior surface to provide an area for the attachment of the supporting structure of the housing, said top member being respectively formed of a plurality of sector plates secured to one another and to said ring member and extending upwardly therefrom, said bottom member comprising a plurality of sector plates secured to one another and to said annular ring member and extending downwardly therefrom.

4. A dust collector comprising a housing having a top member, a bottom member, and an intermediate member, said intermediate member consisting of an annular ring having a substantially free exterior surface to provide an area for the attachment of the supporting structure of the housing, said top member being respectively formed of a plurality of sector plates secured to one another and to said ring member and extending upwardly therefrom, said bottom member comprising a plurality of sector plates secured to one another and to said annular ring member and extending downwardly therefrom, and means for supporting said housing secured to said annular ring member.

ROBERT A. BRIGGS, Jr.